(12) United States Patent
Liu

(10) Patent No.: US 10,438,060 B2
(45) Date of Patent: Oct. 8, 2019

(54) VIDEO FLOW ANALYSING METHOD AND CAMERA DEVICE WITH VIDEO FLOW ANALYSING FUNCTION

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 245 days.

(21) Appl. No.: 15/279,435

(22) Filed: Sep. 29, 2016

(65) Prior Publication Data

US 2017/0098299 A1 Apr. 6, 2017

(30) Foreign Application Priority Data

Oct. 1, 2015 (TW) .............................. 104132350 A

(51) Int. Cl.
| | |
|---|---|
| *H04N 7/18* | (2006.01) |
| *G06K 9/00* | (2006.01) |
| *G06T 7/20* | (2017.01) |
| *G06K 9/32* | (2006.01) |

(52) U.S. Cl.
CPC ...... *G06K 9/00577* (2013.01); *G06K 9/00711* (2013.01); *G06K 9/00771* (2013.01); *G06K 9/3233* (2013.01); *G06T 7/20* (2013.01); *G06T 2207/10016* (2013.01); *G06T 2207/30196* (2013.01); *G06T 2207/30232* (2013.01); *G06T 2207/30236* (2013.01); *G06T 2207/30241* (2013.01); *G06T 2207/30242* (2013.01)

(58) Field of Classification Search
CPC ........... G06K 9/00577; G06K 9/00771; G06K 9/3233; G06K 9/00711; G06T 7/20; G06T 2207/30196; G06T 2207/30242; G06T 2207/30232; G06T 2207/10016; G06T 2207/30236; G06T 2207/30241
USPC ....................................................... 348/143
See application file for complete search history.

(56) References Cited

U.S. PATENT DOCUMENTS

| | | | | |
|---|---|---|---|---|
| 5,973,732 | A * | 10/1999 | Guthrie .............. | G06K 9/00778 348/150 |
| 6,697,104 | B1* | 2/2004 | Yakobi ............... | G06K 9/00778 348/143 |
| 8,165,348 | B2* | 4/2012 | Hampapur ......... | G06K 9/00778 348/169 |
| 8,582,816 | B2* | 11/2013 | Lee .................... | G06K 9/00771 382/103 |

(Continued)

FOREIGN PATENT DOCUMENTS

| | | |
|---|---|---|
| TW | 200727204 | 7/2007 |
| TW | 201324383 A1 | 6/2013 |

*Primary Examiner* — Richard T Torrente
(74) *Attorney, Agent, or Firm* — Winston Hsu

(57) ABSTRACT

A video flow analyzing method and a related camera device are applied to determine whether an object passes through a monitoring area. The video flow analyzing method includes drawing two boundaries on a video image correlative to the monitoring area to form a counting path, utilizing endpoints of the two boundaries to define an inlet and an outlet of the counting path, setting an initial point while the object moves into the counting path by crossing one of the boundaries, the inlet and the outlet, setting a final point while the object moves out of the counting path by crossing one of the boundaries, the inlet and the outlet, and utilizing the initial point and the final point to determine whether the object passes through the counting path.

22 Claims, 13 Drawing Sheets

(56) References Cited

U.S. PATENT DOCUMENTS

| | | | | |
|---|---|---|---|---|
| 2006/0067456 | A1* | 3/2006 | Ku | G07C 9/00 |
| | | | | 377/6 |
| 2006/0233461 | A1* | 10/2006 | Ma | G06K 9/00624 |
| | | | | 382/285 |
| 2008/0212099 | A1* | 9/2008 | Chen | G06T 7/20 |
| | | | | 356/408 |
| 2009/0180583 | A1* | 7/2009 | Park | G06K 9/00771 |
| | | | | 377/9 |
| 2011/0037852 | A1* | 2/2011 | Ebling | G06K 9/00778 |
| | | | | 348/143 |
| 2012/0265430 | A1* | 10/2012 | Weimann | G01C 21/30 |
| | | | | 701/300 |
| 2014/0355829 | A1* | 12/2014 | Heu | G06K 9/00778 |
| | | | | 382/103 |

* cited by examiner

VIDEO FLOW ANALYSING METHOD AND CAMERA DEVICE WITH VIDEO FLOW ANALYSING FUNCTION

BACKGROUND OF THE INVENTION

1. Field of the Invention

The present invention relates to a monitoring camera, and more particularly, to a video flow analyzing method and a related camera device with the video flow analyzing function.

2. Description of the Prior Art

Please refer to FIG. 13. FIG. 13 is a diagram of flow count analyzing technique in the prior art. The flow count analyzing technique is widespread applied to people counting in the market and the scenic district, or applied to counting vehicles on the road and the parking site. The people or the vehicles passing through an access are counted and represented as flow count information. As shown in FIG. 13, the conventional flow count analyzing technique sets a detective line Ls on the access for determining whether an object 30 passes through the access 32. The object 30 is counted and the flow count is increased while object 30 moves across the detective line Ls. However, the conventional flow count analyzing technique cannot recognize a behavior of the object 30 after moving across the detective line Ls. For example, the conventional flow count analyzing technique determines that the object 30 moving along the direction V1 or moving along the direction V2 both conforms to the counting standard; nevertheless, a movement of the object 30 along the direction V2 should not be counted. The conventional flow count analyzing technique simply recognizes the behavior of the object moving across or not across the detective line, and a new flow count analyzing technique capable of effectively recognizing a moving distance and a moving direction of the object relative to the access is an important issue in the related monitoring industry.

SUMMARY OF THE INVENTION

The present invention provides a video flow analyzing method and a related camera device with the video flow analyzing function for solving above drawbacks.

According to the claimed invention, a video flow analyzing method is applied to determine whether an object passes through a monitoring area. The video flow analyzing method includes drawing two boundaries on a video image correlative to the monitoring area to form a counting path, utilizing endpoints of the two boundaries to define an inlet and an outlet of the counting path, setting an initial point while the object moves into the counting path by crossing one of the boundaries, the inlet and the outlet and setting a final point while the object moves out of the counting path by crossing one of the boundaries, the inlet and the outlet, and utilizing the initial point and the final point to determine whether the object passes through the counting path.

According to the claimed invention, a step of utilizing the initial point and the final point to determine whether the object passes through the counting path includes defining a motion vector in accordance with the initial point and the final point, calculating a projecting length of the motion vector relative to a reference axis, and determining whether the object passes through the counting path according to a comparison of the projecting length and a threshold.

According to the claimed invention, a step of utilizing the initial point and the final point to determine whether the object passes through the counting path includes defining at least one reference point by the two boundaries, calculating a first distance between the at least one reference point and the initial point and calculating a second distance between the at least one reference point and the final point, and determining the object passes through the counting path while an absolute value of difference between the first distance and the second distance is greater than a predetermined value.

According to the claimed invention, a camera device with a video flow analyzing function includes an image capturing unit and an operation controlling unit. The image capturing unit is adapted to capture a video image. The operation controlling unit is electrically connected to the image capturing unit and adapted to calculate a passing amount of an object within the video image by drawing two boundaries on the video image correlative to a monitoring area to form a counting path, utilizing endpoints of the two boundaries to define an inlet and an outlet of the counting path, setting an initial point while the object moves into the counting path by crossing one of the boundaries, the inlet and the outlet and setting a final point while the object moves out of the counting path by crossing one of the boundaries, the inlet and the outlet, and utilizing the initial point and the final point to determine whether the object passes through the counting path.

The user can utilizes the video flow analyzing method of the present invention to voluntarily decide a size of the counting path in accordance with distribution and direction of the object moving across the monitoring area by drawing the boundaries. The entry direction and the depart direction of the counting path and the range of the boundaries can be defined by the user, deviation tolerance of a movement of the object can be increased accordingly, and the object which does not pass through the counting path at the specific direction is not counted, so as to obviously enhance accuracy of the video flow analyzing function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
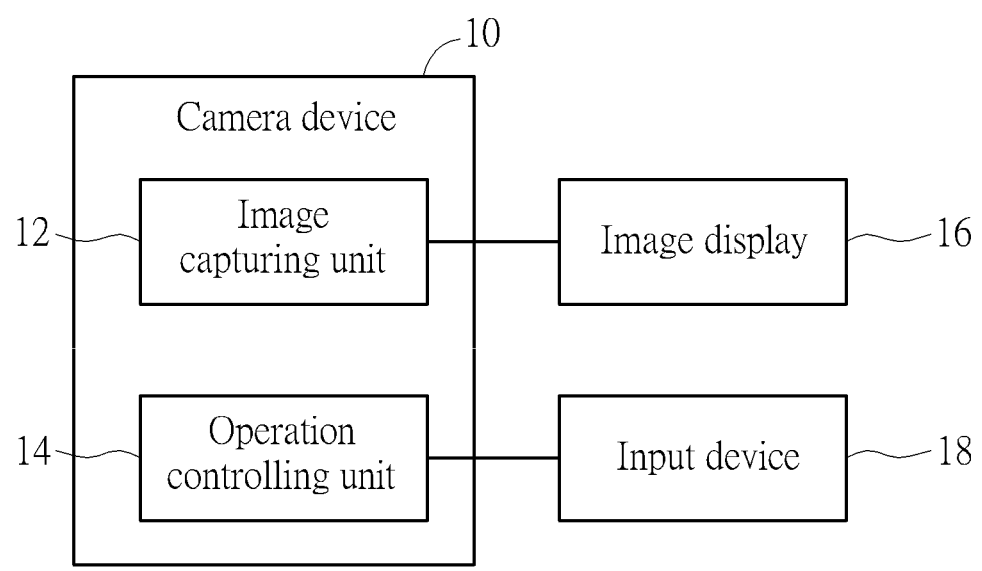
FIG. 1 is a functional block diagram of a camera device according to an embodiment of the present invention.

Please refer to FIG. 1. FIG. 1 is a functional block diagram of a camera device 10 according to an embodiment of the present invention. The camera device 10 includes an image capturing unit 12 and an operation controlling unit 14, and may optionally connected with an image display 16 and/or an input device 18. The image capturing unit 12 is utilized to capture a video image. The operation controlling unit 14 is electrically connected to the image capturing unit 12 to execute a video flow analyzing method via the video image, which means the operation controlling unit 14 can calculate an amount of the object passing through a specific region within the video image. The image display 16 can be a touch display to display the video image. The user may draw a counting path on the video image by touch function of the touch display for flow analysis. Moreover, the image display 16 can be a non-touch display, and the user utilizes the input device 18 to form the counting path on the video image. The input device 18 can be a keyboard or a mouse.

Figure 2:
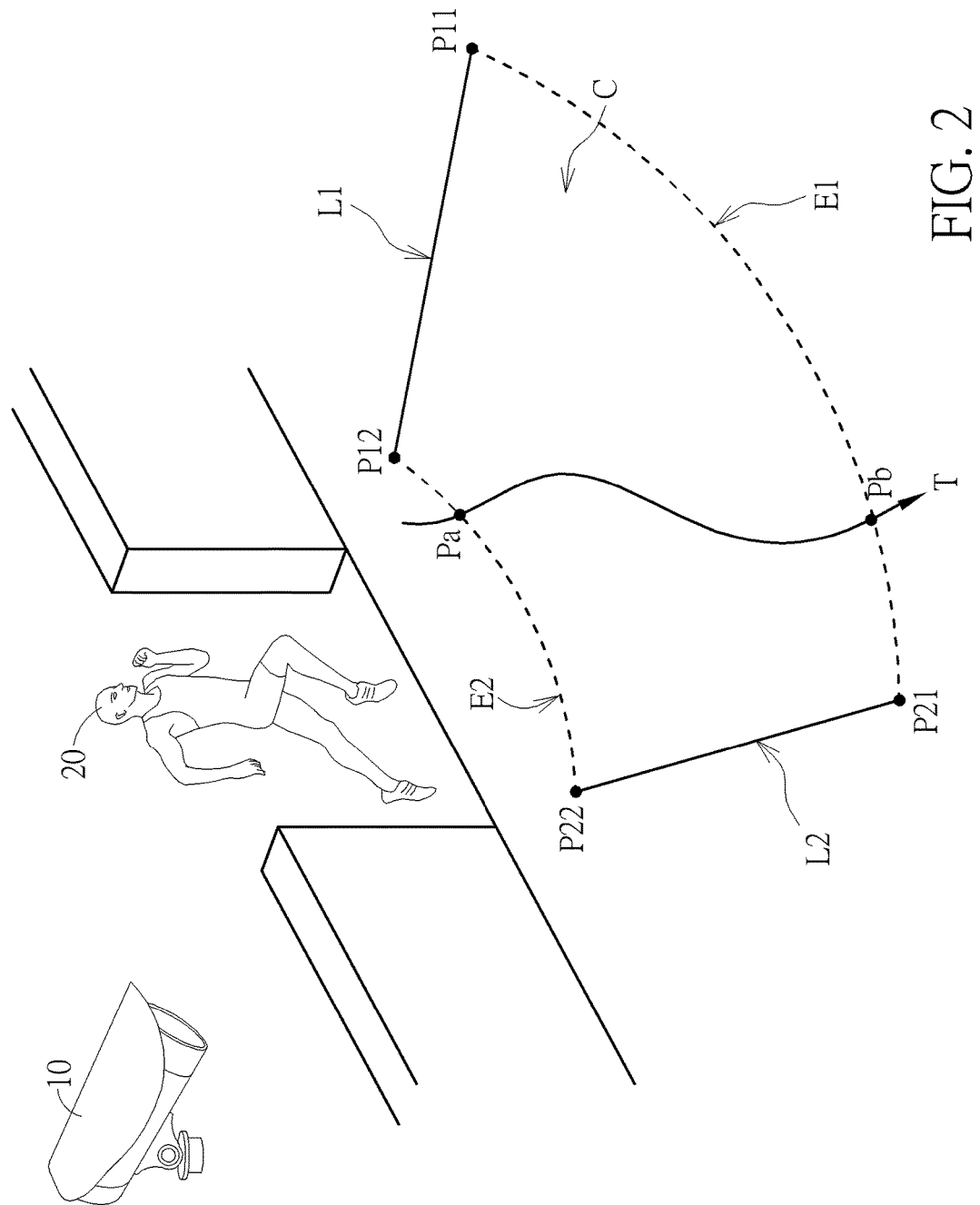
FIG. 2 and FIG. 3 respectively are application diagrams of the camera device according to different embodiments of the present invention.
Figure 3:
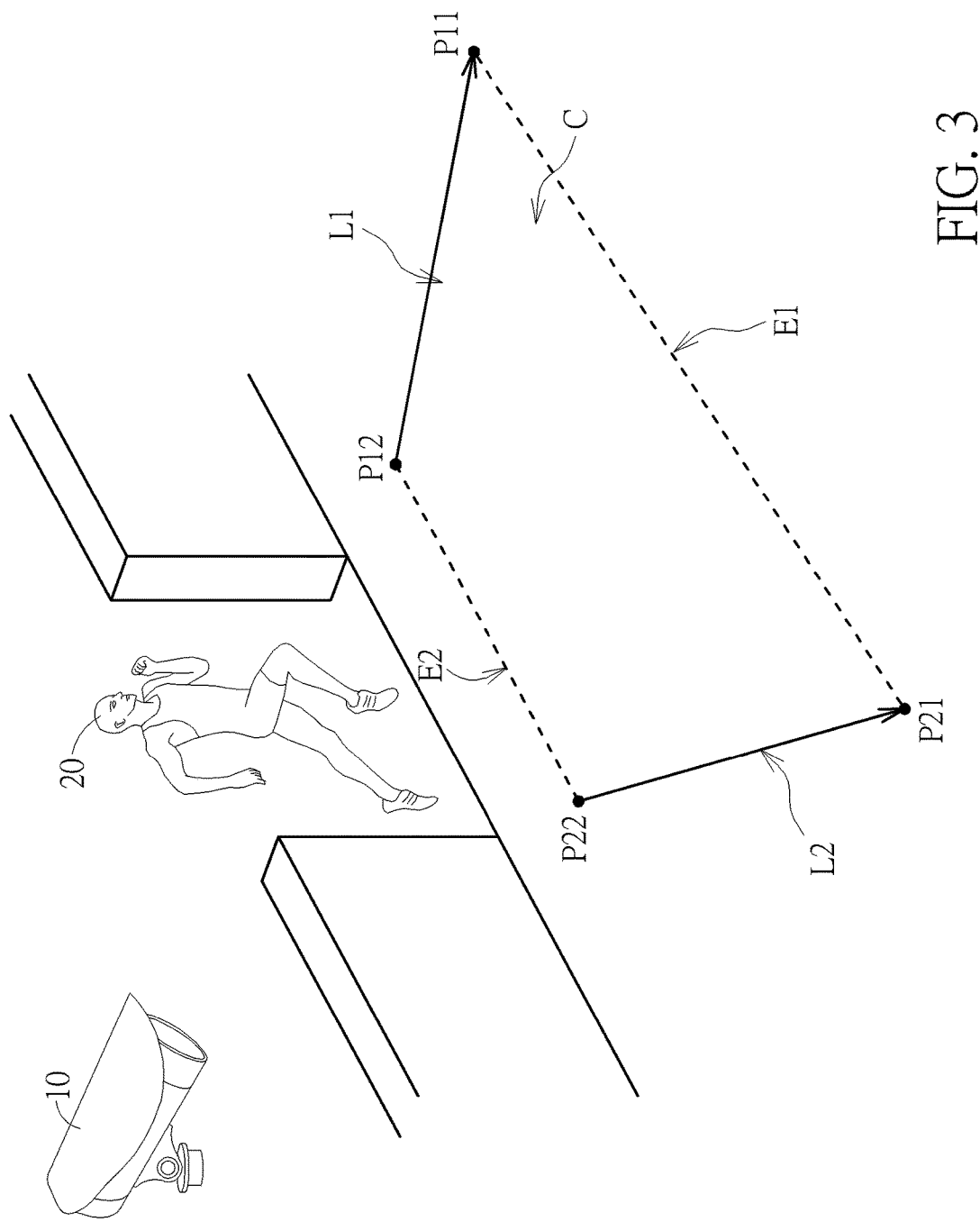
Figure 4:
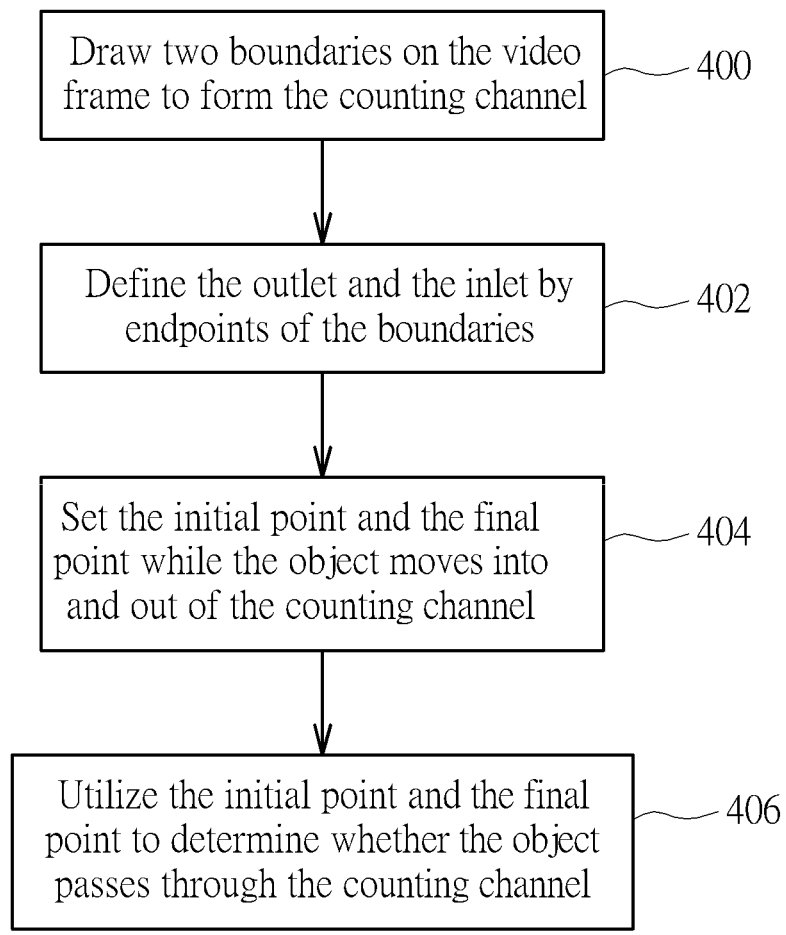
FIG. 4 is a flow chart of a video flow analyzing method according to the embodiment of the present invention.
Figure 5:
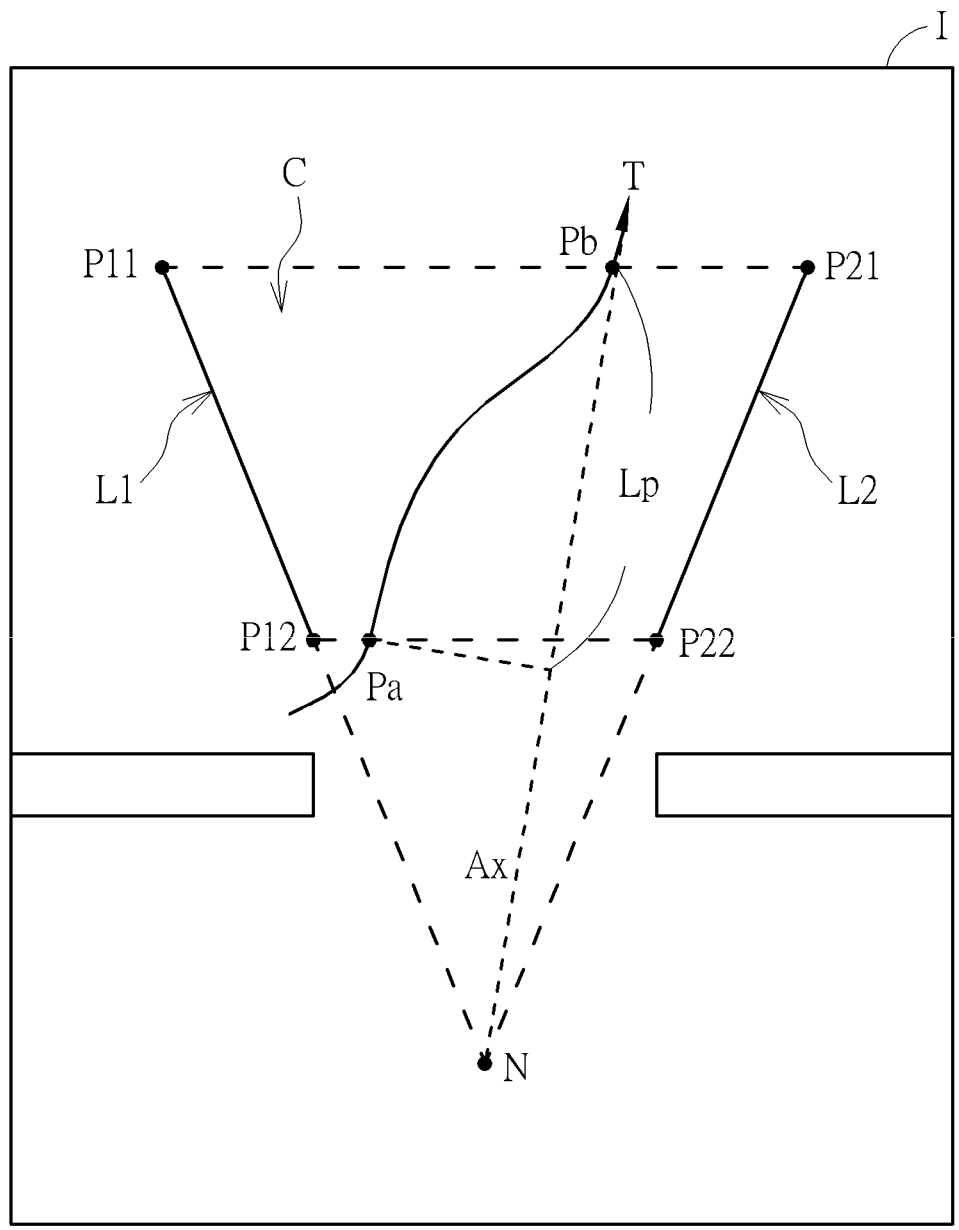
FIG. 5 is a diagram of the video image having the counting path according to the embodiment of the present invention.

Please refer to FIG. 2 to FIG. 5. FIG. 2 and FIG. 3 respectively are application diagrams of the camera device 10 according to different embodiments of the present invention. FIG. 4 is a flowchart of a video flow analyzing method according to the embodiment of the present invention. FIG. 5 is a diagram of the video image I having the counting path C according to the embodiment of the present invention. The camera device 10 captures images about the monitoring area to acquire the video image I. The counting path C is drawn on the video image I to correspond to the specific region within the monitoring area. The camera device 10 executes the video flow analyzing method to analyze whether an object 20 passes through the counting path C, which means the video flow analyzing method can determine whether the object 20 moves across the monitoring area through the specific direction. The video flow analyzing method illustrated in FIG. 4 is suitable for the camera device 10 shown in FIG. 1.

First, step 400 is executed to draw two boundaries L1 and L2 on the video image I correlative to the monitoring area to form the counting path C. The image capturing unit 12 faces toward the monitoring area to acquire the video image I, so the video image I can fully contain details within the monitoring area. The user may utilize the input device 18 to manually draw the boundaries L1 and L2 on the video image I to form the counting path C, or may actuate a drawing command on the video image I to automatically form the counting path C having the boundaries L1 and L2 on the video image I. The boundaries L1 and L2 can indicate a flow direction of the counting path C by arrows, as shown in FIG. 3. Since the boundaries L1 and L2 have no arrow, the flow direction can be defined by a drawing direction of the boundaries L1 and L2, as shown in FIG. 2; however an actual application is not limited to the above-mentioned embodiment. Then, step 402 is executed to define an outlet E1 by endpoints P11 and P21 of the boundaries L1 and L2, and further to define an inlet E2 by endpoints P12 and P22 of the boundaries L1 and L2. The outlet E1 and the inlet E2 normally are virtual lines on the video image I, and cannot be visually observed.

In step 404, the video flow analyzing method can set an entering position as an initial point Pa while the object 20 moves into the counting path C via any of the boundaries L1 and L2, the outlet E1 and the inlet E2, and the video flow analyzing method further can set a leaving position as a final point Pb while the object 20 moves out of the counting path C via any of the boundaries L1 and L2, the outlet E1 and the inlet E2. The positions of the initial point Pa and the final point Pb may be the same or different from each other. As shown in FIG. 2 and FIG. 5, an interlaced point of a trace T interlaced with the inlet E2 is represented as the initial point Pa, and an interlaced point of a trace T interlaced with the outlet E1 is represented as the final point Pb. Therefore, step 406 is executed to utilize the initial point Pa and the final point Pb to determine whether the object 20 passes through the counting path C, so as to accurately calculate an amount of the object 20 passing through the monitoring area. For sensitivity adjustment of the video flow analyzing method, length and/or interval of the boundaries L1 and L2 can be arbitrarily adjusted, and a range of the counting path C is varied accordingly. While the interval between the boundaries L1 and L2 is reduced, the counting path C has a small range, and the object 20 moving past an edge of the counting path C is not counted; while the interval between the boundaries L1 and L2 is magnified, the counting path C has a large range to ensure that all the object 20 moving into the monitoring area can be counted. Besides, the video flow analyzing method has preferred sensitivity since the length of the boundaries L1 and L2 are decreased, and the video flow analyzing method has lower sensitivity since the length of the boundaries L1 and L2 are increased.

Figure 6:
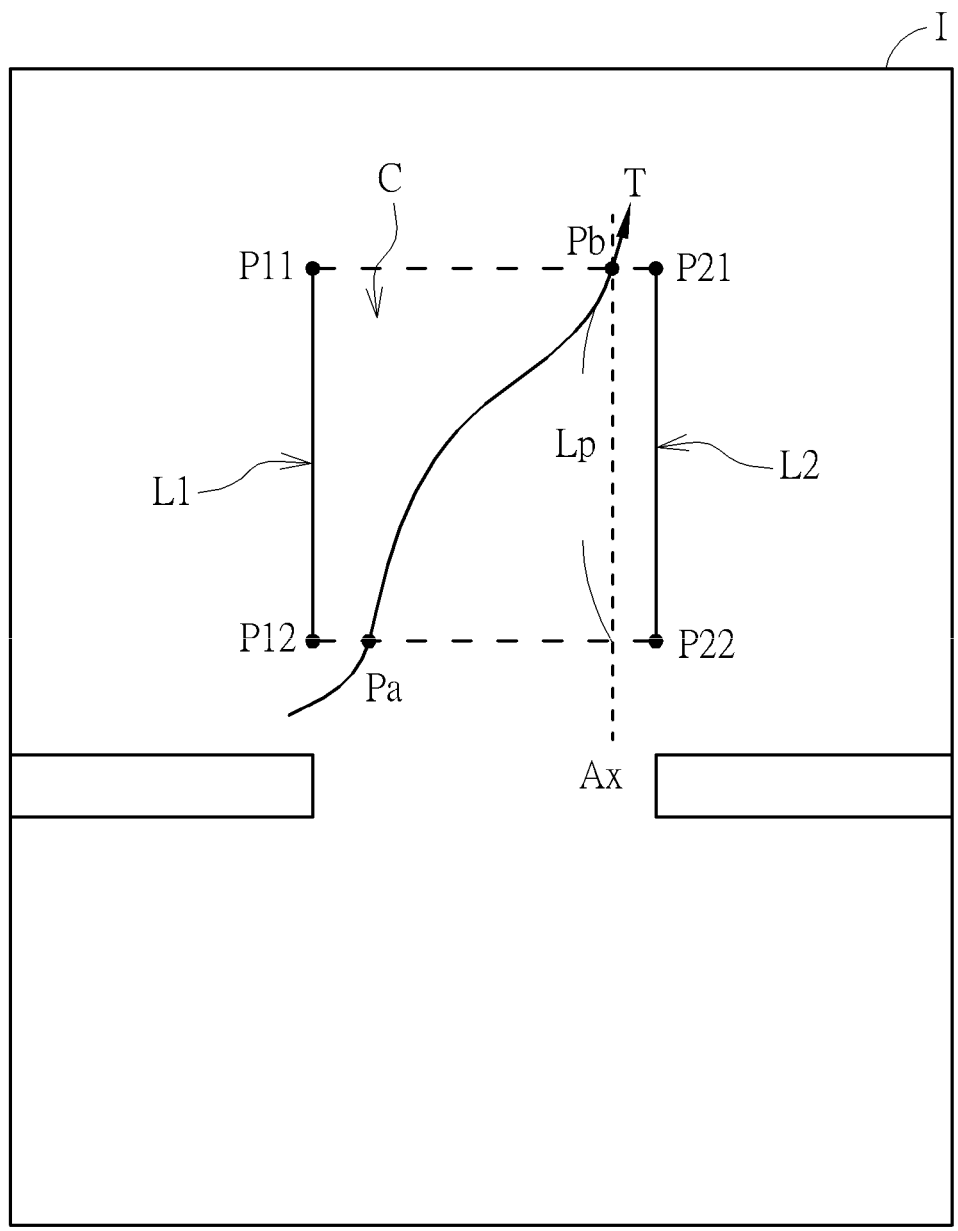
FIG. 6 is a diagram of the video image having the counting path according to another embodiment of the present invention.

The video flow analyzing method of the present invention can determine whether the object 20 passes through the counting path C by several manners. Please refer to FIG. 5 and FIG. 6. FIG. 6 is a diagram of the video image I having the counting path C according to another embodiment of the present invention. The video flow analyzing method utilizes the boundaries L1 and L2 to define a reference axis Ax. As shown in FIG. 5, the boundaries L1 and L2 are not parallel to each other, an interlaced point N is formed by extension of the boundaries L1 and L2, and a connective line between the interlaced point N and the final point Pb is defined as the reference axis Ax. As shown in FIG. 6, the boundaries L1 and L2 are parallel to each other, and the reference axis Ax can be any virtual line interlaced with the final point Pb and substantially parallel to the boundaries L1 and L2. Then, the video flow analyzing method defines a motion vector Vm by decomposition of the trace T, and calculates a projecting length Lp of the motion vector Vm relative to the reference axis Ax. The video flow analyzing method utilizes a predetermined scale of length of the counting path C as a threshold, for example the threshold can be a ninety percentage of the length of the counting path C. Final, the projecting length Lp is compared with the threshold, the object 20 is determined as passing through the counting path C while the projecting length Lp is greater than the threshold, and the object 20 is determined as not passing through the counting path C while the projecting length Lp is smaller than the threshold.

Figure 7:
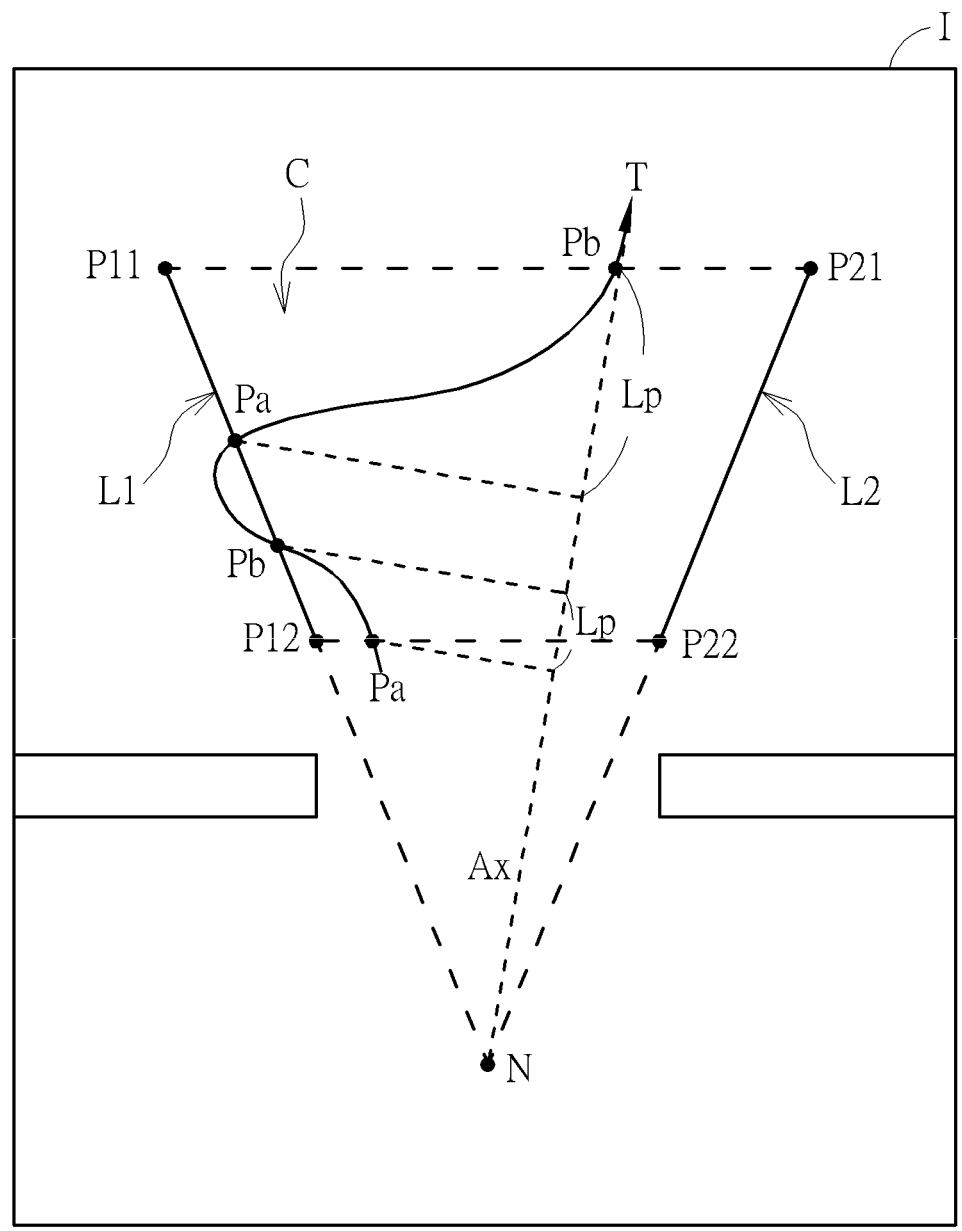
FIG. 7 is a diagram of the video image having the counting path according to another embodiment of the present invention.

Please refer to FIG. 7. FIG. 7 is a diagram of the video image I having the counting path C according to another embodiment of the present invention. The trace T in this embodiment is partly located outside the boundary L1 (or located outside the boundary L2, the outlet E1 or the inlet E2), so that two initial points Pa and two final points Pb are formed by interlace of the trace T and the boundary L1, and two projecting lengths Lp are formed accordingly. The video flow analyzing method compares a sum of the projecting lengths Lp with the threshold, to determine whether the object 20 passes through the counting path C.

In addition, the video flow analyzing method can optionally compare directional difference between the motion vector Vm and a flow direction of the counting path C. The flow direction of the counting path C can be represented as an axial direction of the reference axis Ax, and the directional difference is represented as deviation between the motion vector Vm and the counting path C. While the directional difference is smaller than tolerance, a moving direction of the object 20 conforms to a trend of the counting path C, and the video flow analyzing method determines that the object 20 is able to pass through the counting path C. While the directional difference is larger than the tolerance, the moving direction of the object 20 does not pass through the counting path C by following the flow direction, the video flow analyzing method determines that the object 20 does not pass through the counting path C. The foresaid tolerance can be set as thirty degrees, which represents an included angle between the motion vector Vm and the flow direction. A value of the tolerance is not limited to the above-mentioned embodiment, and depends on actual demand.

Figure 8:
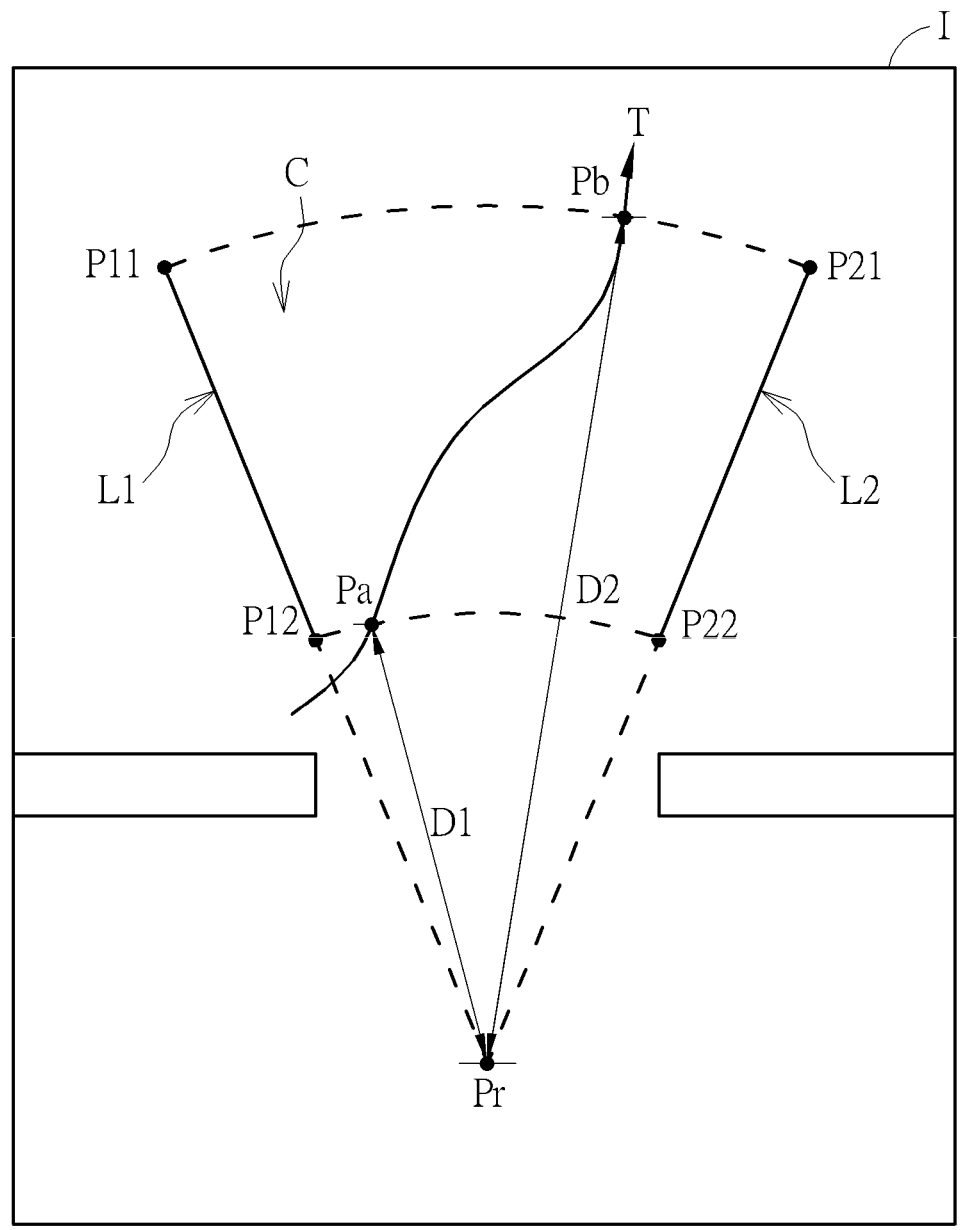
FIG. 8 and FIG. 9 respectively are diagrams of the video image having the counting path according to another embodiment of the present invention.
Figure 9:
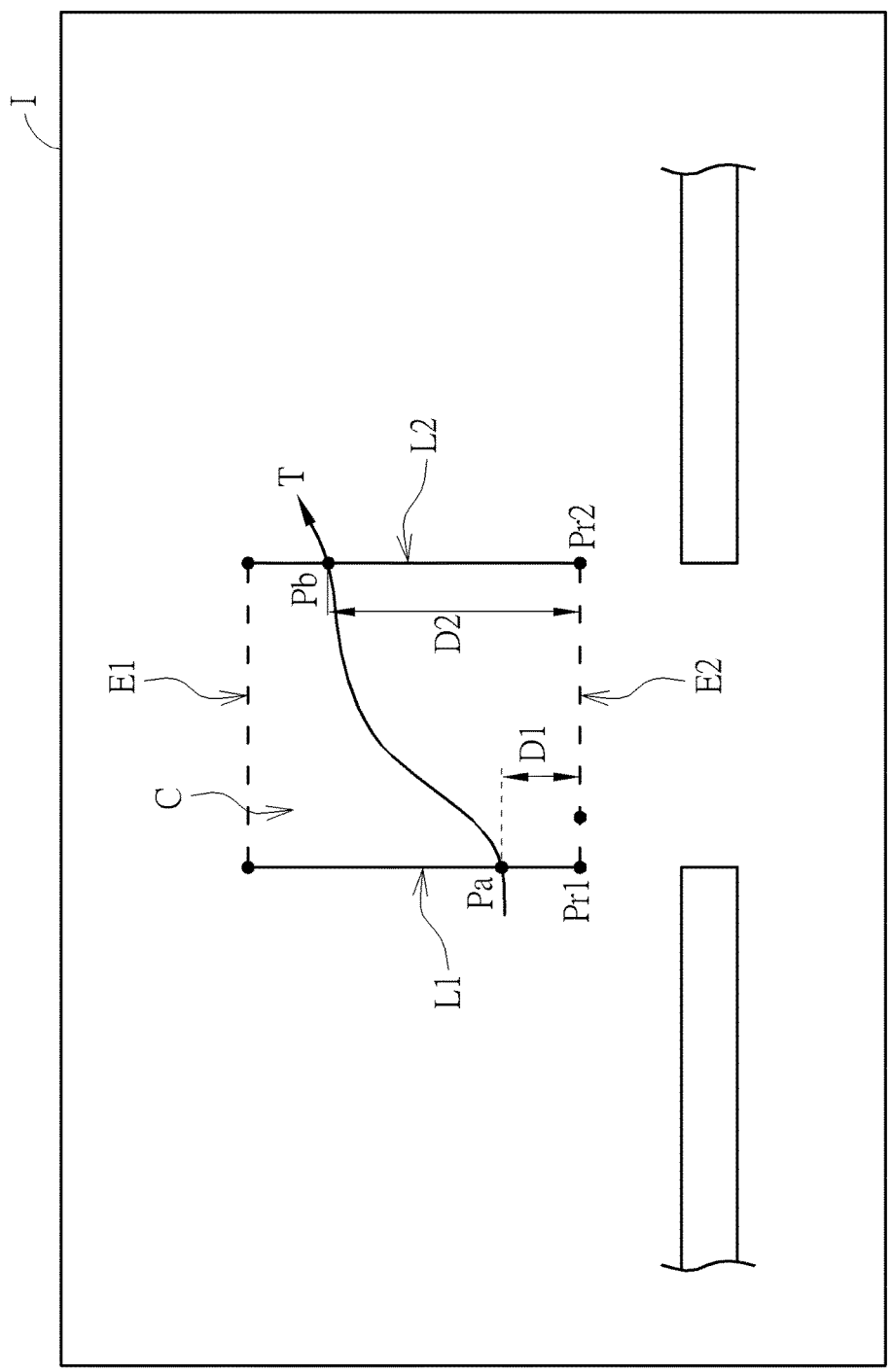

Please refer to FIG. 8 and FIG. 9. FIG. 8 and FIG. 9 respectively are diagrams of the video image I having the counting path C according to another embodiment of the present invention. The video flow analyzing method in this embodiment is different from the video flow analyzing method mentioned as above. As shown in FIG. 8, the boundaries L1 and L2 are not parallel to each other, the video flow analyzing method defines the interlaced point formed by extension of the boundaries L1 and L2 as a reference point Pr (which means there is only one reference point Pr in the embodiment), and calculates a first distance D1 between the reference point Pr and the initial point Pa and a second distance D2 between the reference point Pr and the final point Pb. Final, the video flow analyzing method compares difference between the first distance D1 and the second distance D2 with a predetermined value. The foresaid predetermined value can be varied in accordance with actual demand to adjust sensitivity of the video flow analyzing method. The object 20 can be determined as passing through the counting path C while an absolute value of the foresaid difference is greater than the predetermined value, and the object 20 can be determined as not passing through the counting path C while the foresaid absolute value of the difference is smaller than the predetermined value.

As shown in FIG. 9, the boundaries L1 and L2 are parallel to each other, and this embodiment preferably has more than two reference points Pr1 and Pr2, which are set by whether the trace T is partly moved out of the counting path C. The reference point Pr1 is a first interlaced point formed by the inlet E2 interlaced with a virtual line connected to the initial point Pa and substantially parallel to the boundaries L1 and L2, and the reference point Pr2 is a second interlaced point formed by the inlet E2 interlaced with a virtual line connected to the final point Pb and substantially parallel to the boundaries L1 and L2. That is, the first distance D1 is an interval between the reference point Pr1 (such as the first interlaced point) and the initial point Pa, and the second distance D2 is an interval between the reference point Pr2 (such as the second interlaced point) and the final point Pb. As the embodiments shown in FIG. 8 and FIG. 9, the object 20 is determined as moving into the counting path C while the first distance D1 is greater than the second distance D2, and the object 20 is determined as moving out of the counting path C while the first distance D1 is smaller than the second distance D2. The flow direction of the counting path C in the above-mentioned embodiments may follow directions of the trace T and/or the boundaries L1 and L2, or can be varied according to the drawing direction of the boundaries L1 and L2 while being drawn by the user. Application of the counting path C can be varied in accordance with design demand.

Figure 10:
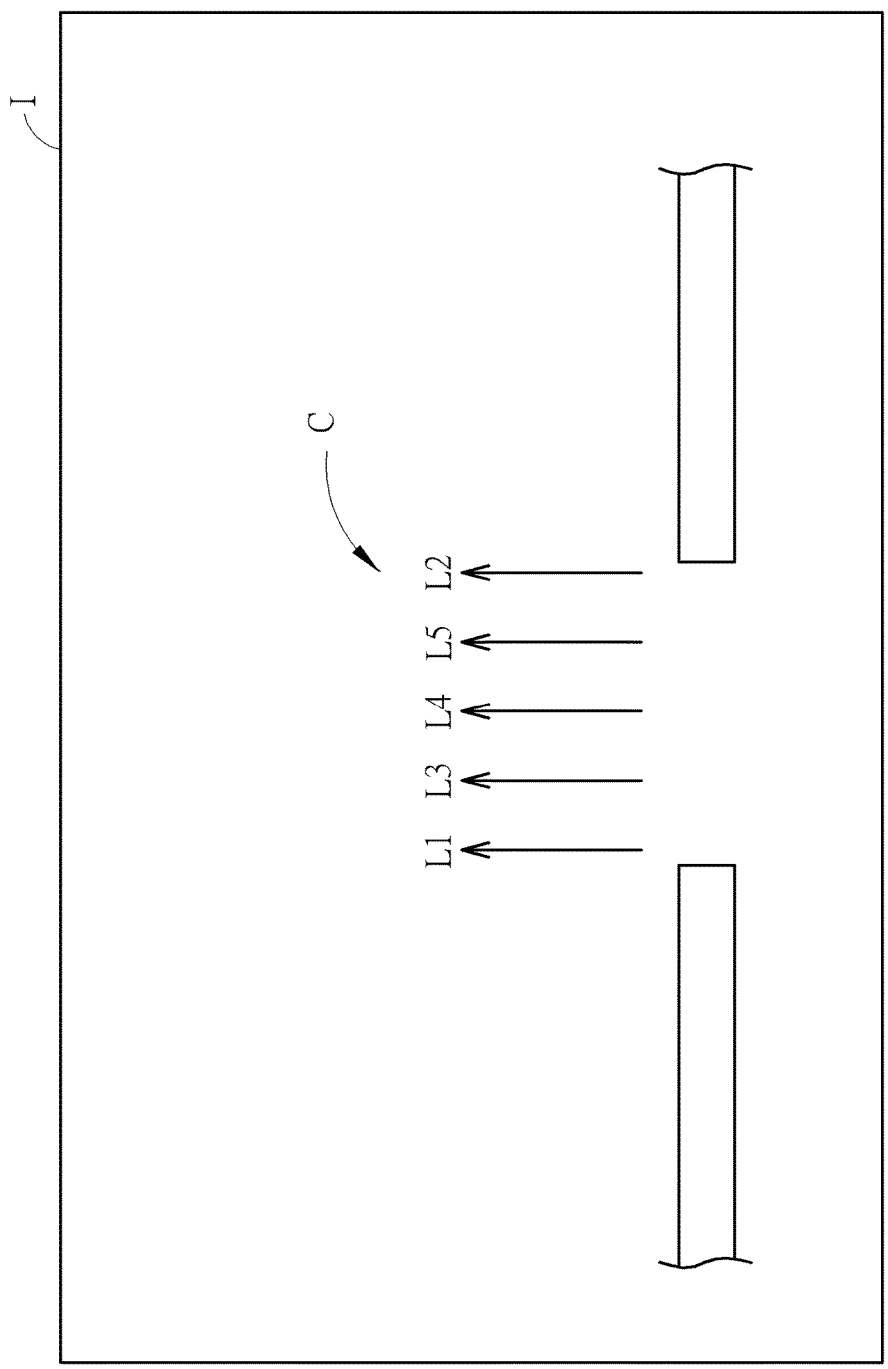
FIG. 10 is a diagram of the counting path according to another embodiment of the present invention.

Please refer to FIG. 10. FIG. 10 is a diagram of the counting path C according to another embodiment of the present invention. While the boundaries L1 and L2 are drawn on the video image, the camera device 10 can automatically generate a plurality of lines between the boundaries L1 and L2 according to a predetermined interval parameter, such as the lines L3, L4 and L5. An amount of the lines is not limited to the above-mentioned embodiment. The lines L3, L4 and L5 are reference data applied to determine whether the object 20 is located inside or outside the boundaries L1 and L2 (which means determining whether the object 20 is located inside or outside the counting path C). It should be mentioned that parameters of the boundaries L1 and L2 (such like the included angle, the rotary angle, the length, the direction and the interval) can be varied arbitrarily even through the counting path C is completed. The user can adjust a range of the counting path C according to actual demand, so as to adjust the sensitivity and recognition definition of the video flow analyzing method.

Figure 11:
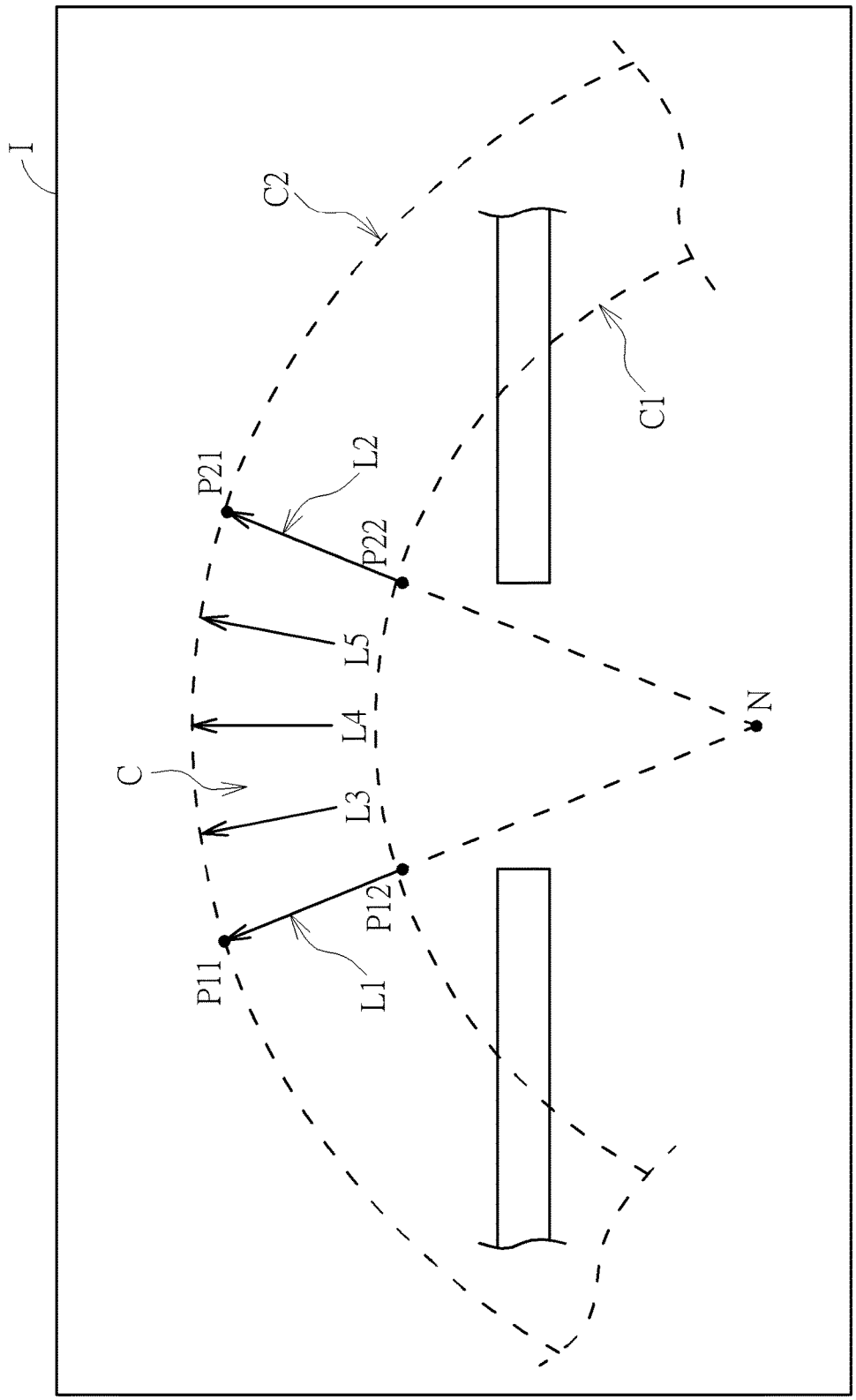
FIG. 11 is a diagram of the counting path having the curve outlet and the curve inlet according to another embodiment of the present invention.

The outlet E1 and the inlet E2 shown in FIG. 5 and FIG. 6 are straight lines connected between the endpoint P11, P12, P21 and P22 of the boundaries L1 and L2; however, the outlet E1 and the inlet E2 further can be formed as curve shown in FIG. 2. Please refer to FIG. 11. FIG. 11 is a diagram of the counting path C having the curve outlet and the curve inlet according to another embodiment of the present invention. The interlaced point N formed by extension of the boundaries L1 and L2 is set as a circle center and concentric curves C1 and C2 (or can be concentric circles) are drawn accordingly. A radius of the curve C1 is represented as an interval between the interlaced point N and the endpoint P12 or P22, and a radius of the curve C2 is represented as an interval between the interlaced point N and the endpoint P11 or P21. A part of the curve C1 located between the endpoints P12 and P22 is set as the inlet E2, a part of the curve C2 located between the endpoints P11 and P21 is set as the outlet E1, and the range of the counting path C can be defined accordingly. As the embodiment shown in FIG. 10, this embodiment further can automatically generate the plurality of lines L3, L4 and L5 between the boundaries L1 and L2, which can be the reference data applied to determine whether the object 20 is located inside or outside the boundaries L1 and L2. The parameters of the boundaries L1 and L2 (such as the length and the interval) can be arbitrarily varied to adjust the sensitivity of the video flow analyzing method.

Figure 12:
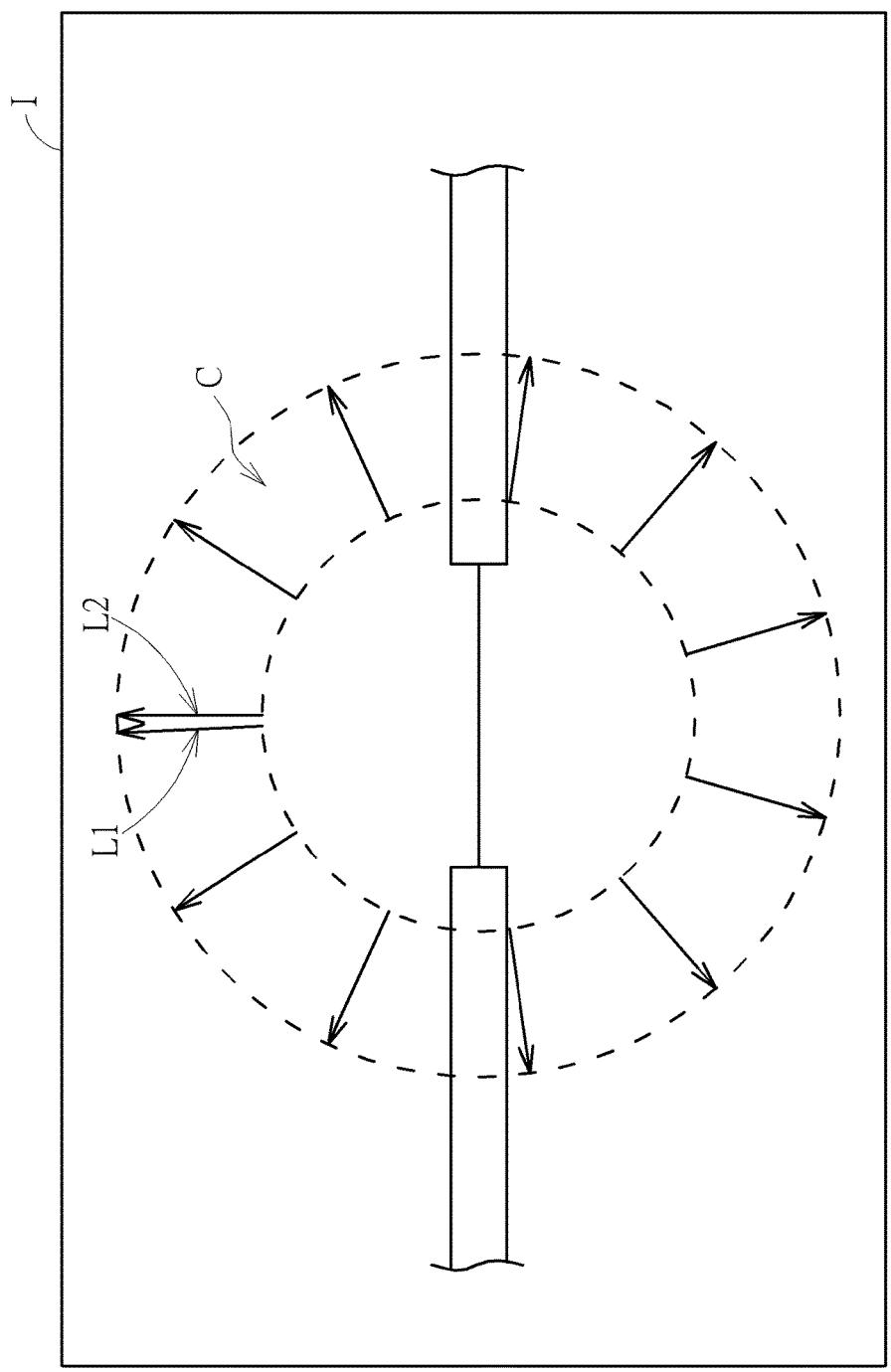
FIG. 12 is a diagram of the counting path with a specific form according to another embodiment of the present invention.
Figure 13:
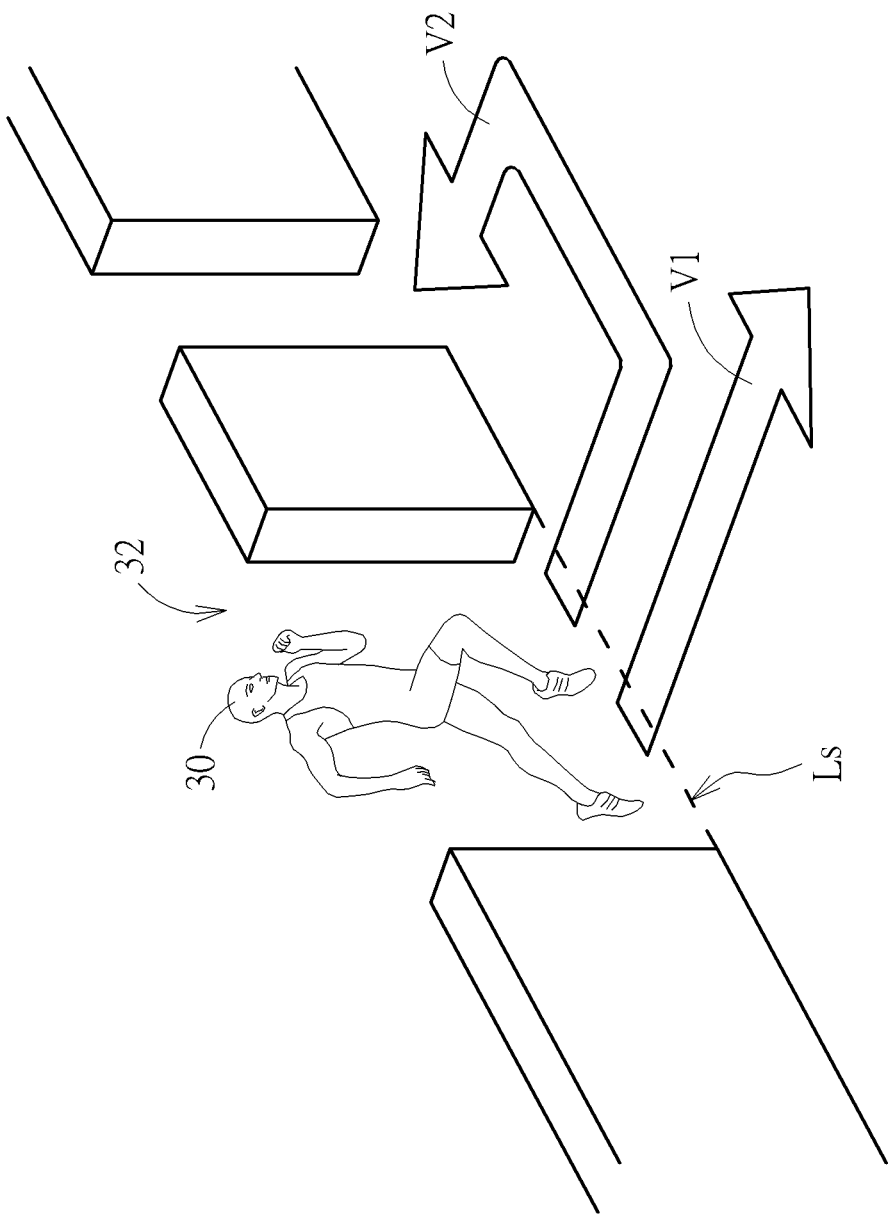
FIG. 13 is a diagram of flow count analyzing technique in the prior art.

Please refer to FIG. 12. FIG. 12 is a diagram of the counting path C with a specific form according to another embodiment of the present invention. The included angle formed between the boundaries L1 and L2 in this embodiment can be set as 360 degrees, and an annular region located within the boundaries L1 and L2 can be represented as the counting path C; further, the included angle formed between the boundaries L1 and L2 can be defined as zero degree, and the annular region located within the boundaries L1 and L2 can be represented as the counting path C of the video flow analyzing method. A central round shape of the annular counting path C is not defined as a range of the counting path. The object 20 moved from the central round shape (a region placed inside counting path C) to an outside of the counting path C, or the object 20 moved from the outside of the counting path C to the central round shape (the region placed inside counting path C) can be counted by the video flow analyzing method.

In conclusion, the user can utilizes the video flow analyzing method of the present invention to voluntarily decide a size of the counting path in accordance with distribution and direction of the object moving inside the monitoring area by drawing the boundaries. The entry direction and the depart direction of the counting path and the range of the boundaries can be defined by the user, deviation tolerance of a movement of the object can be increased accordingly, and the object which does not pass through the counting path at the specific direction is not counted, so as to obviously enhance accuracy of the video flow analyzing function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video flow analyzing method applied to determine whether an object passes through a monitoring area, the monitoring area being determined according to disposition of a camera device executing the video flow analyzing method, the camera device having an operation controller, the video flow analyzing method comprising:
   the operation controller receiving drawing information of two boundaries on a video image correlative to the monitoring area in a manually drawing manner or in an automatically drawing manner to automatically form a counting path automatically containing a flow direction in accordance with a drawing direction of the two boundaries;
   the operation controller automatically defining a virtual inlet and a virtual outlet of the counting path by locating endpoints of the two boundaries in accordance with the flow direction;
   the operation controller automatically locating an initial point while the object moves into the counting path by crossing one of the boundaries, the inlet and the outlet, and automatically locating a final point while the object moves out of the counting path by crossing one of the boundaries, the inlet and the outlet; and
   the operation controller analyzing whether the object passes through the counting path by the initial point and the final point.

2. The video flow analyzing method of claim 1, wherein a step of utilizing the initial point and the final point to determine whether the object passes through the counting path comprises:
   defining a motion vector in accordance with the initial point and the final point;
   calculating a projecting length of the motion vector relative to a reference axis; and
   determining whether the object passes through the counting path according to a comparison of the projecting length and a threshold.

3. The video flow analyzing method of claim 2, wherein the reference axis is a connective line between the final point and an interlaced point since the interlaced point is formed by the two boundaries extended and interlaced with each other.

4. The video flow analyzing method of claim 2, wherein the reference axis is a virtual line interlaced with the final point and substantially parallel to the two boundaries while the two boundaries are not interlaced with each other.

5. The video flow analyzing method of claim 2, wherein the threshold is a predetermined scale of a length of the counting path.

6. The video flow analyzing method of claim 1, wherein the inlet and the outlet formed between the endpoints of the two boundaries is automatically set as a straight line or a curve by the operation controller.

7. The video flow analyzing method of claim 1, wherein a step of utilizing the initial point and the final point to determine whether the object passes through the counting path comprises:
   defining at least one reference point by the two boundaries;
   calculating a first distance between the at least one reference point and the initial point, and calculating a second distance between the at least one reference point and the final point; and
   determining the object passes through the counting path while an absolute value of difference between the first distance and the second distance is greater than a predetermined value.

8. The video flow analyzing method of claim 7, wherein the video flow analyzing method defines one reference point and the foresaid reference point is an interlaced point since the interlaced point is formed by the two boundaries extended and interlaced with each other.

9. The video flow analyzing method of claim 7, wherein the video flow analyzing method defines two reference points while the two boundaries are not interlaced with each other, one of the two reference points is a first interlaced point formed by the inlet interlaced with a virtual line connected to the initial point and substantially parallel to the two boundaries, the other reference point is a second interlaced point formed by the inlet interlaced with a virtual line connected to the final point and substantially parallel to the two boundaries, the first distance is represented as a distance between the first interlaced point and the initial point, and the second distance is represented as a distance between the second interlaced point and the final point.

10. The video flow analyzing method of claim 7, wherein the object is determined as moving into the counting path while the first distance is greater than the second distance, or the object is determined as moving out of the counting path while the first distance is smaller than the second distance.

11. The video flow analyzing method of claim 1, further comprising:
   the operation controller adjusting length of the two boundaries.

12. A camera device with a video flow analyzing function, comprising:
   an image receiver adapted to capture a video image, a monitoring area being determined according to disposition of the image receiver; and
   an operation controller electrically connected to the image receiver and adapted to calculate a passing amount of an object within the video image by receiving drawing information of two boundaries on the video image correlative to the monitoring area in a manually drawing manner or in an automatically drawing manner to automatically form a counting path automatically containing a flow direction in accordance with a drawing direction of the two boundaries, defining a virtual inlet and a virtual outlet of the counting path by locating endpoints of the two boundaries in accordance with the flow direction, automatically locating an initial point while the object moves into the counting path by crossing one of the boundaries, the inlet and the outlet and automatically locating a final point while the object moves out of the counting path by crossing one of the boundaries, the inlet and the outlet, and analyzing whether the object passes through the counting path by the initial point and the final point.

13. The camera device of claim 12, wherein the operation controller executes a step of utilizing the initial point and the final point to determine whether the object passes through the counting path by defining a motion vector in accordance with the initial point and the final point, calculating a projecting length of the motion vector relative to a reference axis, and determining whether the object passes through the counting path according to a comparison of the projecting length and a threshold.

14. The camera device of claim 13, wherein the reference axis is a connective line between the final point and an interlaced point since the interlaced point is formed by the two boundaries extended and interlaced with each other.

15. The camera device of claim 13, wherein the reference axis is a virtual line interlaced with the final point and substantially parallel to the two boundaries while the two boundaries are not interlaced with each other.

16. The camera device of claim 13, wherein the threshold is a predetermined scale of a length of the counting path.

17. The camera device of claim 12, wherein the inlet and the outlet formed between the endpoints of the two boundaries is automatically set as a straight line or a curve by the operation controller.

18. The camera device of claim 12, wherein the operation controller executes a step of utilizing the initial point and the final point to determine whether the object passes through the counting path by defining at least one reference point by the two boundaries, calculating a first distance between the at least one reference point and the initial point and calculating a second distance between the at least one reference point and the final point, and determining the object passes through the counting path while an absolute value of difference between the first distance and the second distance is greater than a predetermined value.

19. The camera device of claim 18, wherein the video flow analyzing method defines one reference point and the foresaid reference point is an interlaced point since the interlaced point is formed by the two boundaries interlaced with each other.

20. The camera device of claim 18, wherein the video flow analyzing method defines two reference points while the two boundaries are not interlaced with each other, one of the two reference points is a first interlaced point formed by the inlet interlaced with a virtual line connected to the initial point and substantially parallel to the two boundaries, the other reference point is a second interlaced point formed by the inlet interlaced with a virtual line connected to the final point and substantially parallel to the two boundaries, the first distance is represented as a distance between the first interlaced point and the initial point and the second distance is represented as a distance between the second interlaced point and the final point.

21. The camera device of claim 18, wherein the object is determined as moving into the counting path while the first distance is greater than the second distance, or the object is determined as moving out of the counting path while the first distance is smaller than the second distance.

22. The camera device of claim 12, wherein the operation controller further executes a step of adjusting length of the two boundaries.

* * * * *